US006606058B1

(12) United States Patent
Bonek et al.

(10) Patent No.: US 6,606,058 B1
(45) Date of Patent: Aug. 12, 2003

(54) BEAMFORMING METHOD AND DEVICE

(75) Inventors: Ernst Bonek, Vienna (AT); Klaus Hugl, Vienna (AT)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/937,284

(22) PCT Filed: Mar. 24, 2000

(86) PCT No.: PCT/AT00/00072

§ 371 (c)(1), (2), (4) Date: Nov. 15, 2001

(87) PCT Pub. No.: WO00/59072

PCT Pub. Date: Oct. 5, 2000

(30) Foreign Application Priority Data

Mar. 26, 1999 (AT) ............................................. 565/99

(51) Int. Cl.$^7$ ................................................ G01S 3/28
(52) U.S. Cl. ....................... 342/383; 342/367; 455/562
(58) Field of Search ................................ 342/383, 367; 455/562

(56) References Cited

U.S. PATENT DOCUMENTS 5,634,199 A 5/1997 Gerlach et al. ............... 455/63
5,778,324 A 7/1998 Smith ......................... 455/562
5,848,060 A 12/1998 Dent .......................... 370/281
6,229,481 B1 * 5/2001 Katz .......................... 342/367

FOREIGN PATENT DOCUMENTS

EP 755 090 1/1997
WO WO 96/37975 11/1996
WO WO 97/00543 1/1997

OTHER PUBLICATIONS

Farsakh, Christof et al, "Spatial Covariance Based Downlink Beamforing in an SDMA Radio System", IEEE Trans of Communications, vol. 46, No. 11, Nov. 1998, pp. 1497–1506.*

Rashid–Farrokhi, Farrokh et al, "Transmit Beamforming and Power Control for Cellular Wireless Systems", IEEE Journal on Selected Areas in Communications, vol. 16, No. 8, Oct. 1998, pp. 1437–1450.*

Montalbano, Guiseppe, et al, "Matched Filter Bound Optimization for Multiuser Downlink Transmit Beamforming", IEEE international Conf. on Universal Personal Communications, Oct., 1998, pp. 677–681, vol. 1.*

(List continued on next page.)

*Primary Examiner*—Gregory C. Issing
(74) *Attorney, Agent, or Firm*—Pillsbury Winthrop LLP

(57) ABSTRACT

A beamforming method and device for adaptive antenna arrays including several antenna elements (1.1. to 1.M) in the downlink of frequency duplex systems, wherein antenna weights ($W_k(f_S)$) are determined for the antenna elements (1.1 to 1.M) for downlink transmission on the basis of directional information of the uplink; in detail, the antenna weights ($W_k(f_S)$) for downlink transmission are determined on the basis of the power angle spectrum ($APS_k$) of the uplink of the individual users (B1 to BK), wherein the power angle spectrum ($APS_k$) is modified by masking out undesired regions.

14 Claims, 7 Drawing Sheets

OTHER PUBLICATIONS

Liang, Ying–Chang et al, "Transmit Antenna Array Techniques for Cellular CDMA Systems", IEEE Symposium on Personal, Indoor and Mobile Radio Communications, Sep., 1998, pp. 1369–1400, vol. 3.*

Aste, T. et al, "Downlink Beamforming Avoiding DOA Estimation for Cellular Mobile Communications", Proc. of the 1998 IEEE International Conf. on Acoustics, Speech and Signal Processing, May, 1998, pp. 3313–3316, vol. 6.*

Fonollosa, Javier et al, "Downlink Beamforming for Cellular Mobile Communications in Freqeuncy Selective Channels", IEEE Signal Processing Workshop in Signal Processing Advances in Wireless Communications, Apr. 1997, pp. 197–200.*

Xu, Guanghan et al, "An Effective Transmission Beamforming Scheme for Freqeuncy Division Duplex Digital Wireless Communication Systems", International Conference on Acoustics, Speech and Signal Processing, May, 1995, pp. 1729–1732, vol. 3.*

* cited by examiner

BEAMFORMING METHOD AND DEVICE

This is the U.S. National Stage of International Application No. PCT/AT00/00072, which was filed on Mar. 24, 2000 in the German language.

The invention relates to a beamforming method for adaptive antenna arrays including several antenna elements in the downlink of frequency duplex systems, wherein antenna weights are determined for the antenna elements for downlink transmission on the basis of directional information of the uplink.

Furthermore, the invention relates to a beamforming device for adaptive antenna arrays including several antenna elements in the downlink of frequency duplex systems, comprising a signal processing unit used to determine antenna weights for the antenna elements for downlink transmission on the basis of directional information of the uplink.

It is known to electronically modify array antennas consisting of several individual antennas in respect to their directional characteristics in order to adaptively adapt the same to the respective channel situation in the optimum manner. Adaptive antennas initially were employed in radar technology, yet also their application in mobile communication systems has been investigated for quite some time. The use of adaptive antennas may lead to a reduction of the received interference by directed reception, a reduction of the generated interference by directed transmission and a reduction of the time dispersion of the mobile radio channel and hence a reduction of the intersymbol interference decisively codetermining the bit error rate.

These improvements may be used for a capacity gain, to increase the spectral efficiency, to reduce the necessary transmission power by the antenna array gain, to improve the transmission quality (reduced bit error rate), to increase the data rate and to extend the range of action.

Although not all advantages can be exploited at one and the same time, it is, nevertheless, feasible to achieve some of the above-mentioned improvements in each case. Thus, it would be absolutely essential to enable, by means of adaptive antennas, a more efficient utilization of the frequency spectrum available and, at the same time, an increase in the capacity and hence possible number of users in a cell at the same frequency band and the same number of base stations.

Mobile cellular wireless communication nets, in general, are limited in interference, i.e., the spatial reuse of one and the same radio channel, on the one hand, and the spectral efficiency, on the other hand, are limited by common channel interferers. A radio channel is defined by its frequency and/or its time slot (in the time multiplex—TDMA—time division multiple access) or its code (in the code multiplex—CDMA—code division multiple access). To supply more than one user by one and the same radio channel in TDMA and FDMA (frequency division multiple access) systems, methods based on the spatial divisibility and the direction-selective reception in the uplink (mobile station transmitting, base station receiving) as well as the direction-selective transmission of the user signals in the downlink (base station transmitting, mobile station receiving) have been proposed (socalled SDMA—space division multiple access system). The direction-selective transmission/reception in CDMA systems may also be used to increase the possible number of users on one frequency and hence raise the spectral efficiency and the capacity of a mobile cellular radio system. Thus, the possible number of users on a communication channel, that can be detected in the uplink by the base station through the linear adaptive antenna array and supplied in the downlink is increased with the interference remaining the same.

Three basic methods are known to divide the signals of the individual users by common channel interference suppression and detect the same: (1) Methods based on the knowledge of the spatial structure of the antenna array (socalled spatial reference methods), cf. R. Roy and R. Kailrath, "ESPRIT—Estimation of Signal Parameters via Rotational Invariance Techniques", IEEE Trans. Acoust., Speech and Signal Processing, Vol. 37, July 1989, pp. 984–995; (2) methods based on the knowledge of a known signal sequence (socalled temporal reference methods), cf. in S. Ratnavel, A. Paulraj and A. B. Constantinides, "MMSE Space-Time Equalization for GSM Cellular Systems", Proc. IEEE, Vehicular Technology Conference 1996, VTC 96, Atlanta, Ga., pp. 331–335; and (3) socalled "blind" methods using known structural signal properties for signal division and detection, cf. in A-J. van der Veen, S. Talwar, A. Paulraj "A Subspace Approach to Blind Space-Time Signal Processing for Wireless Communication Systems", IEEE Transactions on Signal Processing, Vol. 45, No. 1, January 1997, pp.173–190.

Various methods based on different estimates of the mobile radio channel are used for the downlink. In principle, either the directions of incidence of the signals of the mobile stationd (cf., e.g., U.S. Pat. No. 5,515,378 A or EP-755 090 A) are used, or the spatial covariance matrix (spatial correlation matrix) is used for beam formation (cf. U.S. Pat. No. 5,634,199 A).

A difficult problem is set by the different carrier frequencies in frequency duplex systems (FDD systems). In FDD systems, the signals both in the uplink and in the downlink are transmitted at different frequencies, thereby ensuring the necessary division between transmitted and received data both at the mobile and base stations. Due to the frequency difference, the antenna directivity pattern will be different, if the same physical antenna array and the same antenna weights (amplitude and phase) are used at different frequencies. For this reason, it is not advisable to use the same antenna weights for transmission and reception at the base station of a mobile cellular communication system. The exclusive use of the direction of incidence estimated in the uplink does not have any problems with that frequency offset, yet restricts beam formation to a single discrete direction of incidence, what is in contradiction to the physical nature of the mobile radio channel and, therefore, results in a limited capacity gain by the adaptive antenna. The use of the spatial covariance matrix of the uplink, however, involves the drawback of a frequency offset.

Various approaches have already been described to compensate for that frequency duplex distance in the spatial covariance matrix. Thus, it has been proposed to estimate in the uplink the direction of incidence, the signal power and the pertinent angular spread of each user, cf. T. Trump and B. Ottersten, "Maximum Likelihood Estimation of Nominal Direction of Arrival and Angular Spread Using an Array of Sensors", Signal Processing, Vol. 50, No. 1–2, April 1996, pp. 57–69. From that estimate for the uplink, an estimate of the spatial covariance matrix for the downlink is made, cf. also P. Zetterberg, "Mobile Cellular Communications with Base Station Antenna Arrays: Spectrum Efficiency, Algorithms and Propagation Models", thesis, Royal Institute of Technology, Stockholm, Sweden, 1997. That method, however, will function only if each mobile station has but a single nominal direction of incidence in respect to the base station. Due to reflections on mountains in rural areas or large building complexes in urban areas, this condition is frequently not met, thus rendering this approach inapplicable.

Another prior art proposal aims to use in the base station for transmission and reception in a frequency duplex system, two different antenna arrays scaled with the applied wavelength; cf. G. G. Rayleigh, S. N. Diggavi, V. K. Jones and A. Paulraj, "A Blind Adaptive Transmit Antenna Algorithm for Wireless Communication", Proceedings IEEE International Conference on Communications (ICC 95), IEEE 1995, pp. 1494–1499, or the corresponding WO 97/00543 A. There, the two "adapted" antenna arrays, however, have to be manufactured and calibrated in a highly precise manner and placed in exactly the same position. Moreover, a second antenna array is required, thus raising costs superproportionally.

According to U.S. Pat. No. 5,634,199 A already mentioned above, the spatial covariance matrix of the downlink is to be measured directly by transmitting test signals from the base station and retransmitting the measured signals by the mobile station (cf. also W096/37975, which also refers to the transmission of test signals). However, that test signal method requires system capacity for the feedback process involved and, as a result, reduces any possible capacity increase. Furthermore, the standard of already existing mobile cellular communication systems would have to be changed, because no such feedback by the mobile cellular station has so far been provided in any mobile cellular communication system.

In U.S. Pat. No. 5,848,060 A the estimation of the spatial covariance matrix of the uplink from the reception signals of the same is described; the relative phases of the matrix elements occurring are then scaled by the ratio of transmission frequency to reception frequency ($f_S/f_E$). Due to the multipath propagation of the individual signals, the frequency, however, enters nonlinearly into the phase relation of the individual antenna elements. This application is, therefore, limited to cases where direct visual contact is provided between transmitter and receiver without reflections from different directions such as, for instance, in satellite communication.

In order to obtain a covariance matrix for the downlink, it was also proposed to apply a rotation matrix to the covariance matrix of the uplink, which rotation matrix corrects the phases of a wave coming from a defined direction by the ratio of transmission frequency to reception frequency $f_S/f_E$, cf. the already mentioned document G. G. Rayleigh, S. N. Diggavi, V. K. Jones and A. Paulraj, "A Blind Adaptive Transmit Antenna Algorithm for Wireless Communication", Proceedings IEEE International Conference on Communications (ICC 95), IEEE 1995, pp. 1494–1499. Yet, only the phase relation of a direction of incidence in respect to the base station is properly corrected there. If there are several different directions of incidence, that method will fail, wherefor it is applicable only in rural areas having a dominant direction of incidence.

The above-mentioned thesis by P. Zetterberg, "Mobile Cellular Communications with Base Station Antenna Arrays: Spectrum Efficiency, Algorithms and Propagation Models", thesis, Royal Institute of Technology, Stockholm, Sweden, 1997, also contains the proposal to apply a compensation matrix to the covariance matrix of the uplink. That compensation matrix is valid only for very small relative duplex distances $2(f_S-f_E)/f_S+f_E$ and is averaged over the whole region of the application angle of the adaptive antenna. That method does not correct the frequency difference, but only reduces the deviation, thus "blurring" the spatial structure of the mobile radio channel contained in the covariance matrix over the total angular region. Consequently, that method is not applicable at all.

Finally, it has already been proposed to decompose the covariance matrix of the uplink in Fourier coefficients and restore it at the transmission frequency, cf. J. M. Goldberg and J. R. Fonollosa, "Downlink beamforming for spatially distributed sources in mobile cellular communications", Signal Processing Vol. 65, No. 2, March 1998, pp.181–199. That method tries to restore the exact phase relation of the individual signal paths at the transmission frequency, yet likewise blurs the spatial structure of the covariance matrix.

Thus, it is an object of the present invention to provide a method and a device of the initially defined kind, which efficiently enable such beamforming in the downlink of FDD systems so that the interferences also of the signals transmitted from the base station and received by the mobile stations may be reduced and the number of users to be supplied, i.e., mobile stations, may be increased.

To this end, the method according to the invention, of the initially defined kind is characterized in that the antenna weights for downlink transmission are determined on the basis of the power angle spectrum of the uplink of the individual users, wherein the power angle spectrum is modified by masking out undesired regions.

Correspondingly, the device according to the invention, of the initially defined kind is characterized in that the signal processing unit is arranged to determine the antenna weights for downlink transmission on the basis of the power angle spectrum of the uplink of the individual users upon modification of the former by masking out undesired regions.

In the technology according to the invention, downlink beamforming is, thus, based on the power angle spectrum of the uplink of the individual users with undesired angular regions being gated out in said power angle spectrum, i.e., possible interferers are blocked out in the power angle spectrum in order to ensure the optimum orientation of the main lobe in the direction of the respective user. Thus, according to the invention, the important, useful regions of the power angle spectrum are extracted and taken as a basis to determine the antenna weights for downlink beamformation. Investigations have revealed that particularly good results in regard to interference suppression will be obtained, if only one dominant part of the power angle spectrum is "cut out" of the same.

In doing so, it is advantageous if the power angle spectrum is estimated using a known signal sequence of the transmission signal, such as spread code, midamble, etc. It is also advantageous if the power angle spectrum of the uplink is estimated on the basis of the spatial covariance matrices of the uplink of the individual users or, optionally, their mean values. Furthermore, it has been shown to be beneficial if the respective spatial covariance matrix of the downlink is determined on the basis of the modified power angle spectrum of the individual users, or its mean value. Finally, it is advantageous if the spatial covariance matrix of the downlink, or its mean value, is used to calculate the antenna weights for transmission.

Thus, beamforming of the spatial properties of the mobile radio channel in respect to the spatial covariance matrix is preferably effected, which comprises the four steps of

- estimating the spatial covariance matrix of the uplink;
- determining the power angle spectrum by spectral search methods at the reception frequency;
- reconstructing the spatial covariance matrix of the downlink using the estimated modified power angle spectrum at the transmission frequency; and
- calculating the antenna weights for each user of the physical channel.

The technology of this invention is applicable in a manner unrestricted by the propagation conditions of the electromagnetic waves. It is not subject to any restrictions in respect to a single dominant direction of incidence for each user and may be implemented without any additional hardware equipment. There are no assumptions whatsoever as to the frequency difference between transmission and reception cases and, therefore, the technology described herein will function also independently of the relative duplex distance. In doing so, neither cumbersome iterative approximation procedures nor high-resolution direction estimation algorithms are required, thus providing a very calculation-effective solution.

In the following, the invention will be explained in more detail by way of examples and with reference to the drawing. Therein:

FIG. 1 is a schematic illustration of an adaptive antenna with downlink beam formation;

FIG. 2 schematically depicts a linear antenna array with an incident wave to illustrate path differences;

FIG. 3 schematically depicts a beamforming device, illustrating a base station and several mobile stations;

The task of beam formation in the downlink of mobile cellular communication systems including adaptive antennas at the base station consists in transmitting the signals of the individual users from the base station in a manner that most of the energy will be received by the desired user and as little energy as possible will be transmitted to other users, where it will occur as an interference. Downlink beam formation meeting such requirements ensures a sufficiently high interference ratio for each user, and hence a sufficiently high transmission quality (bit error rate BER). In order to reach this goal, the main lobe of the antenna pattern must be placed in the direction of the desired user and zero coefficients in the antenna pattern must be placed in the direction of those users which are supplied at the same frequency. This principle is illustrated in FIG. 1.

Figure 1:
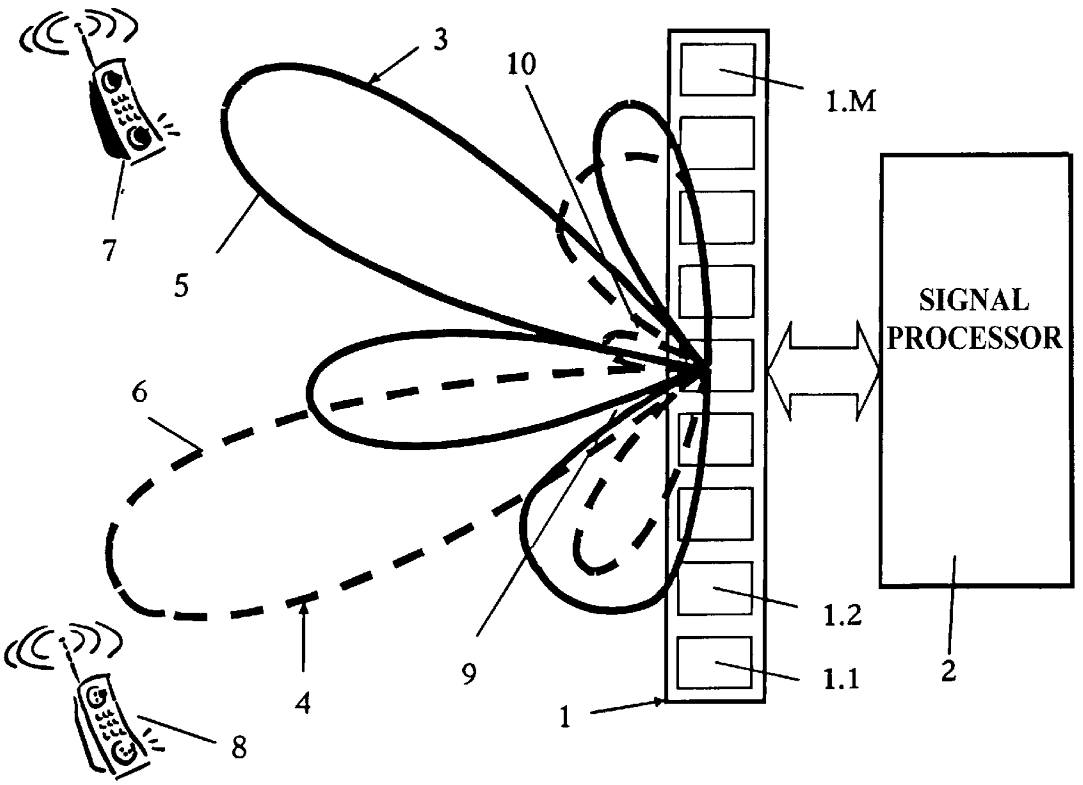

FIG. 1 in detail schematically depicts an adaptive antenna 1 with downlink beam formation, where a signal processor 2 triggers the individual antenna elements 1.1, 1.2 to 1.M at different phases and amplitudes, thus generating the desired antenna pattern 3 or 4, respectively. The main lobes 5 and 6 of the antenna pattern 3 or 4, respectively, are oriented in the direction of the user 7 or 8, respectively, zero coefficients 9 and 10 in the antenna patterns 3 or 4, respectively, being oriented in the direction of the respective other user 8 or 7, respectively.

Figure 2:
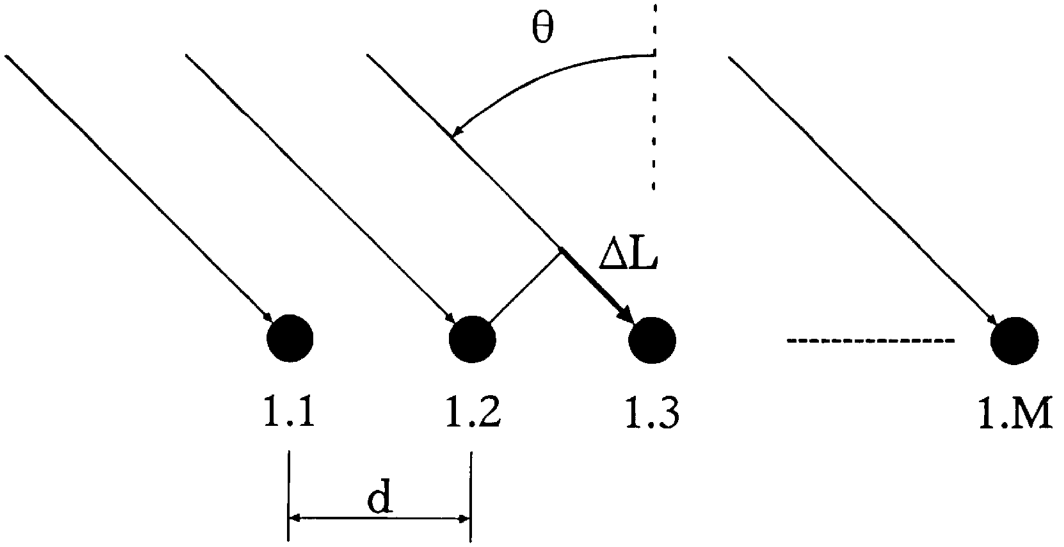

The forms of the antenna patterns 3 and 4, respectively,, are determined as a function of the different weighting of the individual elements of the antenna array 1. This will be explained below by way of the example of a linear antenna array with reference to FIG. 2. FIG. 2 schematically illustrates a wave coming onto the antenna elements 1.1, 1.2, 1.3 to 1.M from a direction Θ.

FIG. 2, furthermnore, shows the distance d between the individual antenna elements and the wave path difference ΔL from one antenna element, e.g., 1.2, to the consecutive antenna element, e.g., 1.3. The distance d is in the order of, for instance, the wavelength and preferably smaller than the wavelength (e.g. approximately half the wavelength).

The path difference ΔL of the electromagnetic wave of an antenna element to the consecutive one corresponds to a phase difference of the reception signal, which may be written as follows:

$$\Delta\varphi = 2\pi\partial\cdot\frac{f}{c}\cdot\sin(\theta)$$

and depends on the wavelength of the transmitted signal. In this relation, f denotes the carrier frequency of the transmitted signal and c the light velocity. From this relation results for the array response of the adaptive antenna 1 to this incident wave, which is also referred to array steering vector a(Θ,f)

$$a(\theta, f) = \left[\begin{matrix}1 & e^{j\cdot 2\pi d\cdot\frac{f}{c}\cdot\sin(\theta)} & \cdots & e^{j\cdot 2\pi d\cdot\frac{f}{c}\cdot(M-1)\cdot\sin(\theta)}\end{matrix}\right]$$

As is apparent from this relation, the array response of the antenna array 1 is a function of both the direction of incidence of the wave and the carrier frequency.

Mobile cellular communication nets comprise not only a single propagation path, but multipath propagation. This means that there are several propagation paths having different wavelengths and different directions between the base station and the mobile station. Systematically, this multipath propagation is outlined in FIG. 3.

Figure 3:
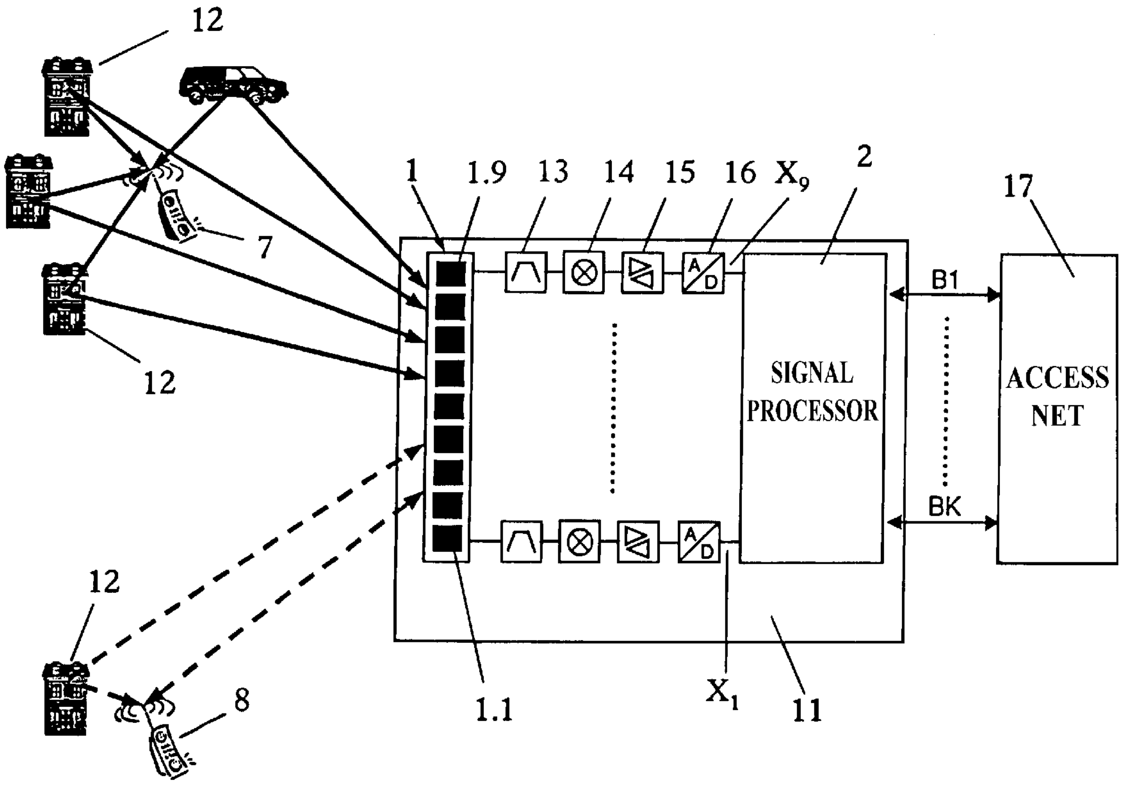

In detail, FIG. 3 depicts a base station 11 comprising an adaptive antenna 1 including nine antenna elements 1.1 to 1.9 and multipath propagation between the base station 11 and mobile stations (MS) 7, 8, multipath propagation being induces, for instance, by reflections on buildings 12.

Figure 4A:
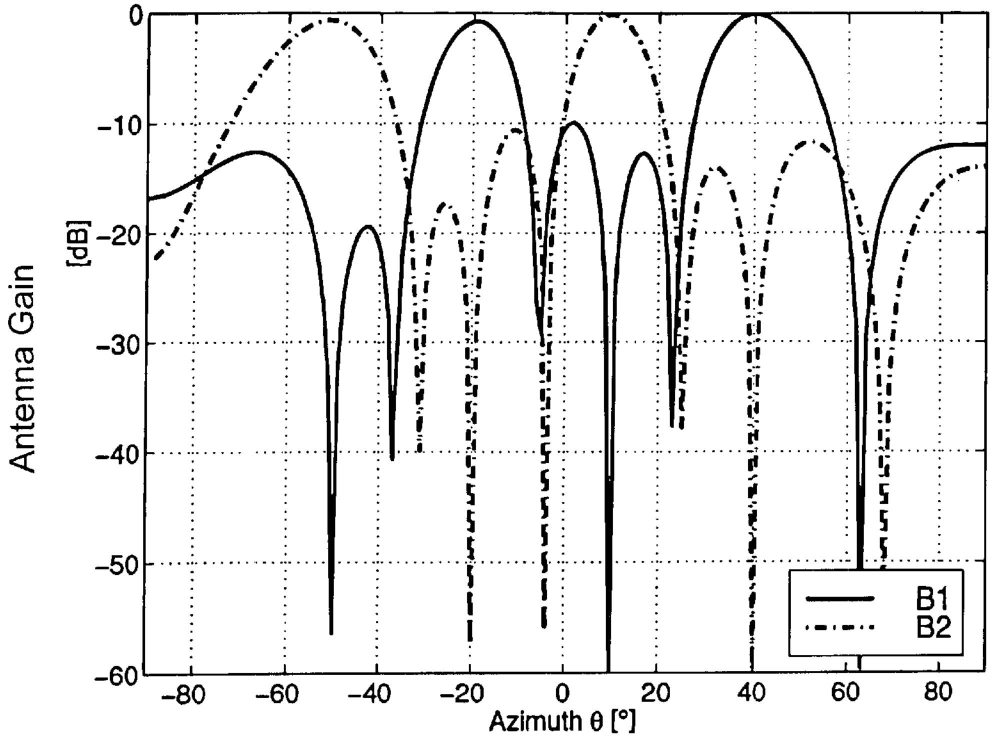
FIG. 4A shows an antenna pattern at an uplink frequency.
Figure 4B:
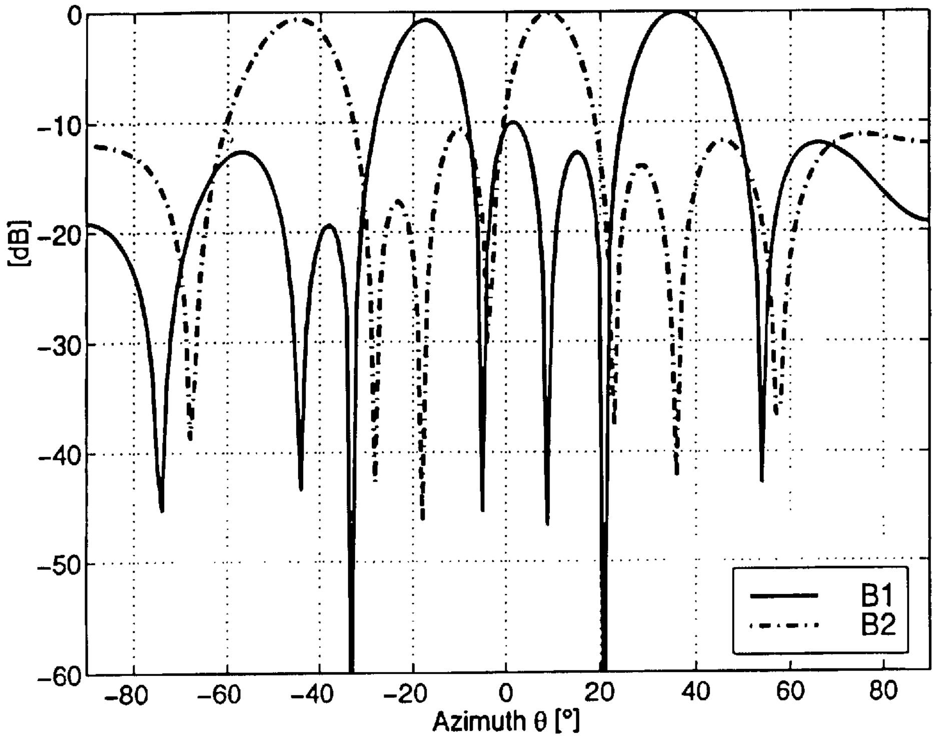
FIG. 4B shows the corresponding antenna pattern at the downlink frequency.

The individual signals superimpose in the uplink on antenna elements 1.1 to 1.9 of the linear antenna array 1 and in the downlink on the antenna of the respective cell phone 7, 8. Whether the individual signals superimpose constructively or destructively depends on the mutual phase relation of the individual waves. Since in a FDD system different carrier frequencies are used for the uplink and the downlink, also the mutual phase relations of the waves will change. For that reason, fading (the constructive and destructive superposition) in the uplink and in the downlink are absolutely uncorrelated. Yet, not only fading but also the antenna pattern changes on account of the frequency shift. Both the position of the main lobe and the position of the zero coefficients and their forms in the array directional characteristic change strongly as illustrated in FIGS. 4A and 4B. FIG. 4A shows an antenna pattern for the uplink frequency and 4B the respective antenna pattern for the downlink frequency. As is apparent from FIG. 4A, the signals for a user B1 come from directions −20° and 40°, and for a user B2 from directions −50° and 10°. By contrast, when using the same antenna weights in the downlink (cf. FIG. 4B), the main lobes for user B1 lie between −18° and 35° and for user B2 at −45° and 8°. (The following values having been taken as carrier frequencies: $f_E$=1920 MHz, $f_S$=2110 MHz).

As is apparent from FIGS. 4A and 4B, both the zero coefficients and the main lobes have been shifted in their directions on account of the different frequencies. The influence on the main lobes is, however, not so strong, because these are very wide, anyway, and hence only an antenna gain smaller by a maximum of 0.5 dB will result. The zero coefficients in the direction of the respective other user are, however, very narrow and, when using the same antenna weights for the downlink as for the uplink, the generated interference will be drastically increased for the respective other user. For that reason, it is not advisable to use the same antenna weights for reception and for transmission at the base station 11.

Because of the frequency shift, also the fading between a transmission and a reception case is uncorrelated, and another antenna pattern will result when using the same antenna weights.

The uncorrelated fading cannot be compensated, since all path lengths would have to be known, which is impossible. The influence of the carrier frequency on the antenna pattern may, however, be compensated by suitable beamforming, which, as a result, causes the interference generated for the other users to be reduced and the transmission quality and system capacity to be enhanced.

A signal processing unit 2 is used in the base station 11 for the formation of this signal, cf. FIG. 3, which unit determines antenna weights on the basis of the received signals to trigger the antenna elements 1.1. to 1.M, in particular also for the downlink. In doing so, users B1 to BK are supplied simultaneously, for instance, in the mobile radio communication system K, the antenna array 1 in a general manner consisting of M antenna elements 1.1. to 1.M. The signals received are band-limited at 13 (filtering by the aid of channel selection filters) and mixed into the base band at 14, amplified at 15 and digitalized at 15, and in the signal processing unit 2 the signals are detected by the aid of adaptive algorithms. In the downlink, the signals are then accordingly weighted, modulated (at 14) and beamed from the antenna 1. FIG. 3 schematically further illustrates the signal exchange between the base station 11 and the access net 17.

Figure 5:
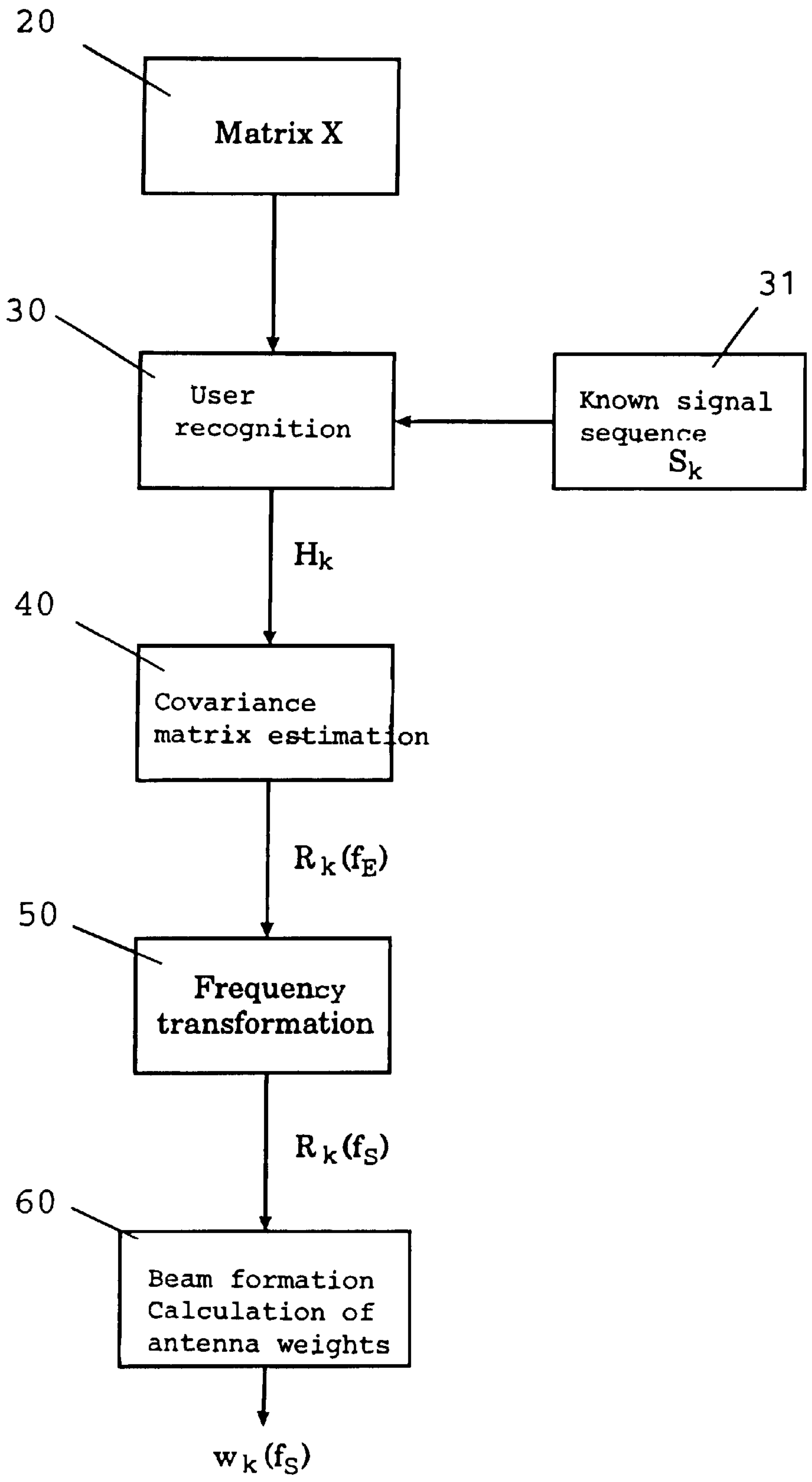
FIG. 5 is a flow chart illustrating the determination of the antenna weights for downlink beam formation.

FIG. 5 depicts a flow chart which schematically illustrates the evaluation of the input signals as far as to the determination of the antenna weights for the desired beam formation in the downlink.

As illustrated in FIG. 5, a matrix X of noisy input signals of several co-channel signals serves as an input data set which is to be processed further in the signal processing unit 2. The matrix X contains N sample values with critical sampling (sampling rate 1/T) of K co-channel signals derived from M individual elements of the group antenna 1 as well as interference signals from neighboring cells using the same frequencies. By employing a known signal sequence $S_k$ (block 31 in FIG. 5) of the transmitted signal, with k=1 to K, such as the spread code in CDMA systems or the pre- or midambles in TDMA systems, the channel pulse responses of each of the K users B1 to BK are subsequently estimated on each antenna element 1.1 to 1.M in step 30 ("user recognition"). In doing so, the channel pulse responses of each of the users B1 to BK can be estimated independent of one another by methods known per se (for instance, by correlation with the known signal sequence $S_k$) or all at the same time in one step (for instance, by the method of the smallest error squares).

In more detail, the channel pulse responses are estimated from the received data X and the know signal sequence $S_k$ (pre-, midamble in TDMA, or spread code in CDMA systems), whereby the reception signal may be presented as follows:

$$X(t) = \sum_{K=1}^{K} h_k(t,\tau) * S_k(t) + N(t)$$

where hk(t,τ) and $S_k(t)$ denote the time-variant pulse response at the time t and the transmitted signal of the kth user; and N(t) refers to the vector with the thermal noise on antenna elements 1.1 to 1.M. The summation takes into account that the signals of all K users B1 to BK are received. From this relation, the channel pulse responses of users B1 to BK will then be estimated.

$$X(t) = \sum_{k=1}^{K} h_k(t,\tau) * S_k(t) + N(t)$$

where hk(t,?) and $S_k(t)$ denote the time-variant pulse response at the time t and the transmitted signal of the kth user; and N(t) refers to the vector with the thermal noise on antenna elements 1.1 to 1.M. The summation takes into account that the signals of all K users B1 to BK are received. From this relation, the channel pulse responses of users B1 to BK will then be estimated.

In TDMA systems, the pre- or midambles mentioned may be used to this end—either simultaneously for all users (joint estimate) or separately for each user. The separate estimate likewise may be effected by the method of the least error squares, which in a time—discrete way of writing may be represented as follows:

$$H_k = X \cdot \begin{bmatrix} S_k & 0 & \cdots & 0 \\ & \ddots & & \\ & & \ddots & \\ 0 & \cdots & 0 & S_k \end{bmatrix}^{\#}$$

The joint estimate may be effected as follows:

$$[H_1 \ \cdots \ H_K] = X \cdot \begin{bmatrix} S_1 & 0 & \cdots & 0 \\ & \ddots & & \\ & & \ddots & \\ 0 & \cdots & 0 & S_1 \\ \vdots & \vdots & \vdots & \vdots \\ S_K & 0 & \cdots & 0 \\ & \ddots & & \\ & & \ddots & \\ 0 & \cdots & 0 & S_K \end{bmatrix}^{\#}$$

This corresponds to a joint estimate using the method of the least error squares. The formation of the pseudo-inverse resolvent of a matrix is denoted by "#".

In CDMA systems, the output signal of a filter signal-adapted to the spread code used will be employed. This signal-adapted filter is a standard reception component of CDMA systems; a description of the appropriate relations for the estimate may be obviated here.

The channel pulse response matrices $H_k$ with k=1 to K (for users B1 to BK) contain all the information required for the beamforming process. The channel pulse response matrices have the following structure:

$$H_k = [h_k(0) h_k(T) \ldots h_k((L-1)\cdot T)],$$

where $h_k(t)$ is the vector of the channel pulse response at the time t. In this representation it is assumed that the channel pulse response has a length of L sample values.

After this, the spatial covariance matrices of the uplink of the individual users are calculated by the aid of these channel pulse responses, cf. step 40 in FIG. 5.

A signal arriving from a direction Θ on the antenna array 1 yields an array response that is equal to the already mentioned array steering vector a(Θ,f). The spatial covariance matrix F(f) of this signal in the instant case is defined as $$R(f)=E\{a(\theta,f)\cdot a^H(\theta,f)\}$$

Normally, there are many propagation paths having different reception performances. For that reason, the spatial covariance matrix may be represented as follows:

$$R(f)=E\left\{\int_{\theta=-\pi}^{\pi}P(\theta)\cdot a(\theta,f)\cdot a^H(\theta,f)^H\cdot d\theta\right\}$$

The channel pulse response contains all signals including the array responses and the pertaining signal intensities. For this reason, and by replacing the expected value formation by the temporal mean value (in the time-discrete mean value of the sample values), the spatial covariance matrix may be represented as follows:

$$R_k(f_E)=\sum_{l=0}^{L}h_k(l)\cdot h_k^H(l)=H_k\cdot H_k^H \text{ with } k=1\ \ldots\ K$$

By this relation, the covariance matrices of the uplink of users B1 to BK are, therefore, estimated. The spatial covariance matrix $R_k$ also is frequency-dependent. The spatial covariance matrix $R_k$ of the uplink, in general, is used to calculate the complex antenna weights for the reception by means of adaptive antennas. The use of these antenna weights for the downlink, however, displaces the zero coefficients, as already explained. For that reason, attempts have to be made to transform the spatial covariance matrix $R_k$ from the reception frequency $f_E$ of the base station onto the transmission frequency $f_S$ in order to be able to calculate the antenna weights for the downlink.

This frequency transformation is indicated at step 50 in FIG. 5, the frequency. transformation transforming the spatial structure of the mobile radio channel, which is contained in the spatial covariance matrix $R_k$, from the reception frequency of the base station (uplink frequency) $f_E$ onto the transmission frequency of the base station (uplink frequency) $f_S$. This technique is indicated in more detail in FIG. 6 and will be described in more detail below.

The estimated spatial covariance matrices $R_k$ of the K users of the downlink are formed so as to be hermetic. This means that all directions of incidence are regarded as being independent of one another. The covariance matrices $R_k$ ($f_S$) at a transmission frequency $f_S$, which are obtained at the end of step 50, are used to calculate the optimum antenna weights for downlink transmission. This is carried out in step 60 of FIG. 5. All beamforming algorithms that are based on the knowledge of the spatial covariance matrix may be used for that purpose. The signals for the individual users are then transmitted by the base station 11, multiplied (weighted) by their antenna weights.

Figure 6:
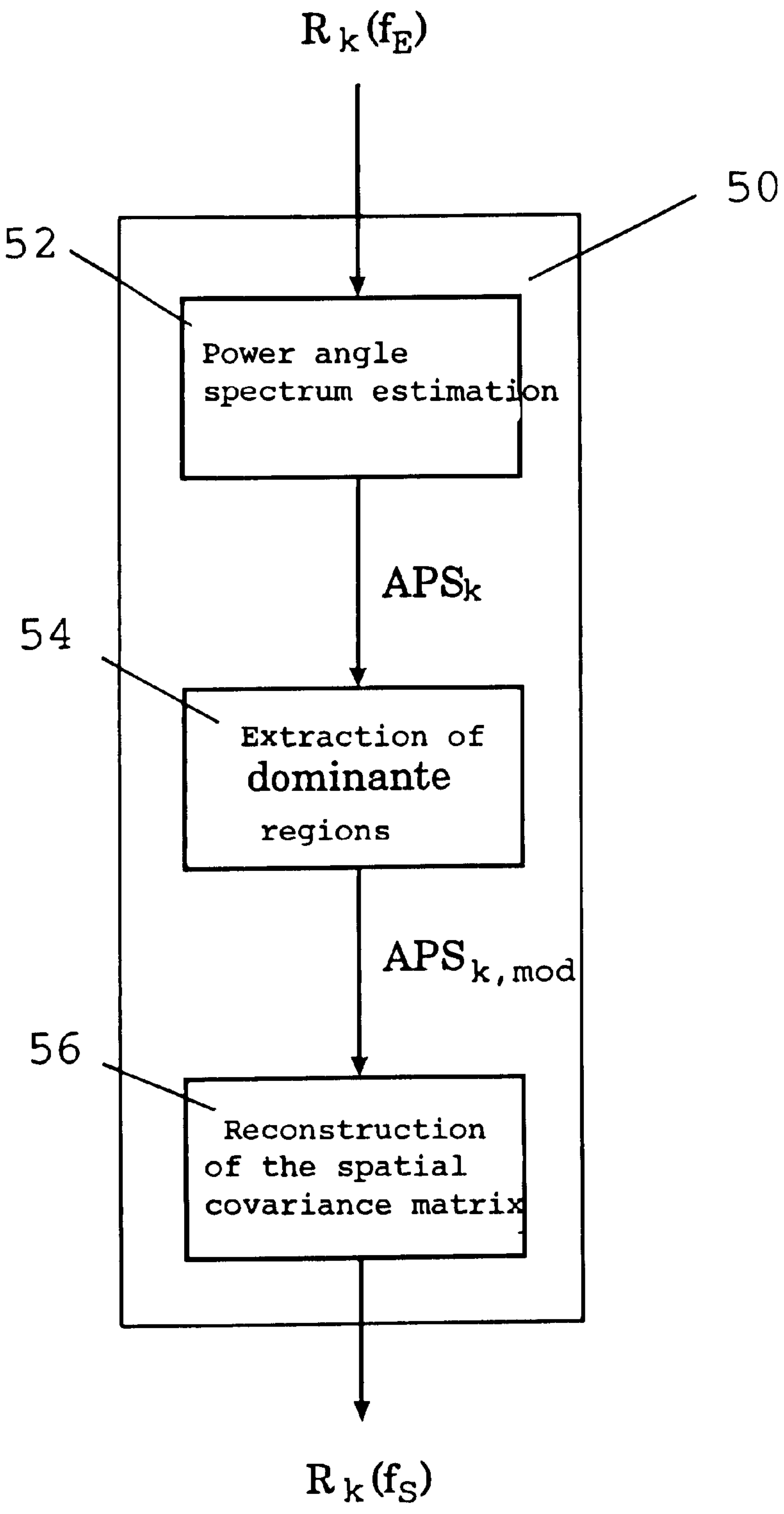
FIG. 6 is a detailed flow chart elucidating the procedure during the frequency transformation represented in FIG. 5.

The following may be said in connection with the frequency transformation (step 50) according to FIG. 6: As already described, the fading (phase relation) of the individual signal paths is uncorrelated in the downlink and in the uplink. Only the directions of incidence of the individual partial waves and their mean signal intensities (power) are equal in the uplink and in the downlink. Therefore, the estimated power angle spectrum is used for beam formation in order to reconstruct the spatial covariance matrix. The power angle spectrum contains the power received from the respective angular region. It is exactly that parameter which is equal both in the uplink and in the downlink. For that reason, all the information that may be utilized for downlink transmission is again contained in the reconstructed covariance matrix. Since only the mean signal intensity remains constant rather than the instantaneous one, time—averaging may be included. Time—averaging may be carried out at three points:

(1) Averaging of the covariance matrices at the reception frequency (uplink)

(2) Averaging of the power angle spectrum (after step 52 in FIG. 6)

(3) Averaging of the covariance matrices at the transmission frequency (downlink).

In principle, it does not matter where averaging takes place, yet studies have revealed that the averaging of the covariance matrix yields particularly good results at the reception frequency.

FIG. 6 illustrates the power angle spectrum estimation at block 52, whereby it is departed from the covariance matrices $R_k$ ($f_E$) of the uplink for the kth user. Basically, any spectral search methods known per se may be employed in this power angle spectrum estimation.

The power angle spectrum $APS_k$ (azimuthal power spectrum) may be estimated as indicated below, by applying the maximum likelihood method (also referred to as minimum variance method or Capon's method, which is disclosed in D. H. Johnson, D. E. Dugeon, "Array Signal Processing—Concepts and Techniques", Prentice Hall, Inc., Englewood Cliffs, (N.J.), 533 pages):

$$APS_k=P_k(\theta)=\frac{1}{\alpha^H(\theta,f_E)\cdot(R_k(f_E))^{-1}\cdot\alpha(\theta,f_E)}.$$

In this relation, a(Θ,$f_E$)is the array steering vector of the uplink, which is a function of the reception frequency $f_E$, the interelement distance d of the linear antenna array with M elements and the direction Θ is indicated below:

$$a(\theta,f_E)=\left[\,1\quad e^{j\cdot 2\pi d\cdot\frac{f_E}{c}\cdot\sin(\theta)}\quad\ldots\quad e^{j\cdot 2\pi d\cdot\frac{f_E}{c}\cdot(M-1)\cdot\sin(\theta)}\,\right]$$

This means that, upon knowledge of the geometry of the uniform-linear antenna array 1 (ratio of antenna element distance d to received wavelength $\lambda_E$, i.e., $d/\lambda_E$), the power angle spectrum $APS_k$ of each of the K users is estimated. It should be understood that this step may be carried out by means of other, similar spectral search methods. The power angle spectrum $APS_k$ does not contain any mutual phase relations of the individual signal paths of the mobile radio channel, what is neither necessary nor reasonable, since fading and phase relations are absolutely uncorrelated on account of multipath propagation, due to the different transmission and reception frequencies prevailing in a frequency duplex system.

Figure 7:
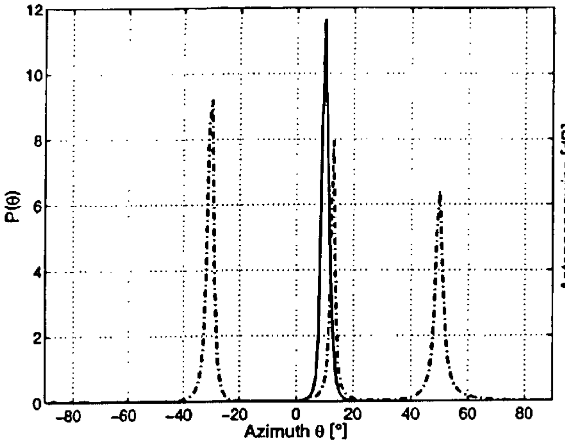
FIG. 7 shows the power angle spectrum of a user with "interferers"

FIG. 7 depicts an example of an estimated power angle spectrum $APS_k$ of a user Bk which is in the direction +10°, viewed from the base station 11. The broken line in FIG. 7 indicates the estimated power angle spectrums of some co-channel interferers which are at −30°, +12° and 50°.

Figure 8:
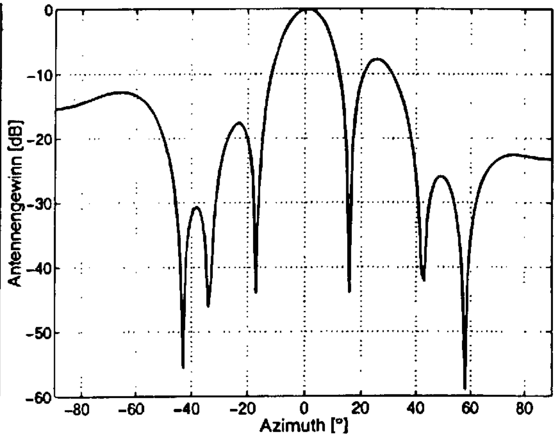
FIG. 8 is an antenna pattern pertaining to FIG. 7 yet prior to modification.

In step 54 of FIG. 6, the dominant regions of the power angle spectrum $APS_k$ are then extracted. In doing so, it is not absolutely necessary to employ the total power angle spectrum $APS_k$ for the reconstruction of the spatial covariance matrix, but it is feasible to use only those angular regions from which the major portion of the signals is received in the uplink, whereby the antenna lobes are consequently directed into these angular regions and zero coefficients in the antenna pattern are plotted only in such angular regions in respect to interference. This technique of masking out some angular regions in order, for example, to place only zero coefficients in the direction of dominant interferers or avoid zero coefficients in the direction of those interferers which are located in approximately the same direction as the desired user and will thus negatively influence the antenna pattern, is exemplified in FIG. 8 (in connection with FIG. 7) as well as in FIGS. 9 and 10. While FIG. 7 indicates the estimated power angle spectrum of the desired user and the interferers, FIG. 8 illustrates the antenna directivity characteristic for this scenario.

From FIG. 7 it is apparent that an interferer and the desired user are located in approximately the same direction (+12° and +10°, respectively). If one tries to reduce the energy sent in the direction of that one interferer which is located at +12°, viewed from the base station, the main lobe will not show precisely into the direction of the desired user.

Figure 9:
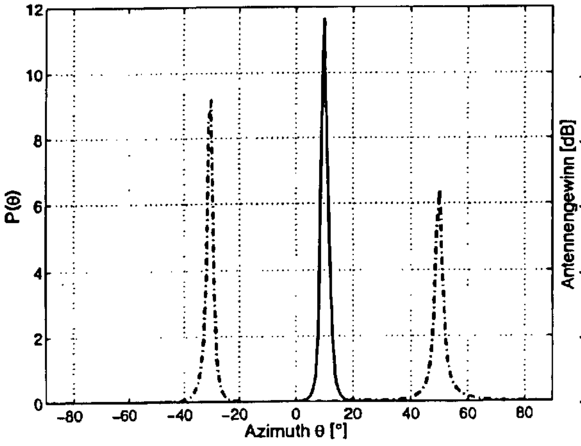
FIGS. 9 and 10 are power angle spectrum and antenna characteristic diagrams corresponding to FIGS. 7 and 8, respectively, yet after masking out of an interferer.
Figure 10:
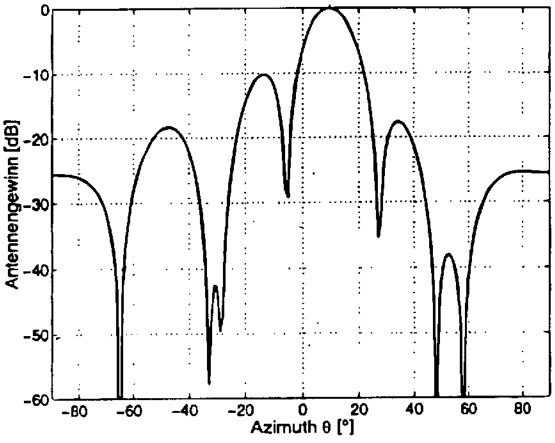

In order to suppress this effect, it is feasible to suppress the portion of said one interferer in the power angle spectrum, thus preventing the main lobe from being displaced. This application of the modification of the power angle spectrum is illustrated in FIG. 9, FIG. 10 illustrating the accordingly modified antenna pattern.

When using the modified power angle spectrum for downlink beam formation, the main lobe in the antenna pattern (FIG. 10) will again show in the direction of the desired user (+10°). Particularly in CDMA systems (the systems of the third mobile communication generation like UMTS are all based on CDMA) comprising a great number of users which are supplied on one channel, the angular divisibility of the users (several users are not located in the same direction, which necessitates a minimum distance of the angles in which the users are located) cannot be safeguarded at all. For that reason, the instantly shown case may frequently occur in CDMA systems.

Estimation errors in the covariance matrices of the users or interferers, respectively, will amplify the shown effect. In real-operation systems, the eventual masking out of defined regions in the power angle spectrum is, therefore, frequently required.

After this, the spatial covariance matrix (correlation matrix) $R_k$ $(f_S)$ of the mobile radio channel of the downlink of the K users is reconstructed by means of the estimated modified power angle spectrum $APS_{k,mod}$ in step 56 of FIG. 6. This is effected according to the following procedure:

$$R_k(f_S)=\int_\theta P_{k,mod}(\theta)\cdot\alpha(\theta, f_S)\cdot\alpha^H(\theta, f_S).$$

The power angle spectrum may naturally be determined not continuously, but only discretely at a defined angle resolution. It has been shown in extensive computer simulations that a resolution of about one degree will be sufficient. Hence results that the integral set forth above may be replaced with a discrete sum including a relatively small number of summands. The discrete sum looks as follows:

$$R_k(f_S)=\sum_{\theta_i} P_{k,\mathrm{mod}}(\theta_i)\cdot a(\theta_i, f_S)\cdot a^H(\theta_i, f_S)$$

$P_k$,mod(Θ) designate the modified power angle spectrum of the $k^{th}$ user.

The method described is characterized in that any directional information of the mobile radio channel is exploited for downlink beam formation without making an error on account of the duplex frequency, thus enabling the same gain in the downlink of mobile cellular communication systems with frequency duplex as is in time duplex systems. In doing so, no assumptions whatsoever as to the number of discrete directions of incidence or a slight duplex distance are used, and hence the technique described is applicable without limitations. Furthermore, the spatial covariance matrix and the channel pulse responses which are required for uplink detection are used also for downlink beam formation and, therefore, need not be calculated separately.

At the frequency transformation output according to block 50 are, thus, obtained the covariance matrices $R_k$ of the downlink ($R_k(f_S)$) for the $k^{th}$ user, and these are finally taken as the basis for beam formation instep 60 according to FIG. 5, i.e., to determine the downlink antenna weights. As already mentioned, any known algorithms that are based on the knowledge of the spatial covariance matrix may be used for beam formation. In the following, an example of an algorithm is elucidated, which is a standard algorithm used in literature to calculate uplink antenna weights (cf., e.g., P. Zetterberg and B. Ottersten: "The Spectrum Efficiency of a Base Station Antenna Array System for Spatially Selective Transmission"" IEEE Transactions on Vehicular Technology, Vol. 44, pp. 651–660, August 1995).

If the covariance matrices of the individual users and interferers are known, the antenna weights may be calculated from that information. Rk(fS) denotes the covariance matrix of the kth user and Qk(fS) the covariance matrix of the interference for the kth user at the transmission frequency fS. The weight vector is calculated from this information as the dominant generalized eigenvector of the matrix pair [Rk(fS), Qk(fS)]. At a reception in the uplink, this method maximizes the ratio of the signal-to-noise ratio SNIRk received. In the downlink, the ratio of the signal power generated for the desired user to the interference power generated for the other users is maximized. Mathematically, this problem may be presented as follows:

$$w_k(f)=\max_{w_k(f)}\frac{w_n^H(f)R_k(f)w_k(f)}{w_k^H(f)Q_k(f)w_k(f)}.$$

For uplink detection the covariance matrices at the reception frequency, and for the calculation of the downlink antenna weights the frequency-transformed covariance matrices (at the transmission frequency of the base station), are used. Yet, the same algorithm is used to calculate the complex antenna weights for reception and transmission by the aid of the adaptive antenna 1. For that reason, and because the spatial covariance matrix is generally used for uplink reception, this beamforming method for the downlink of systems comprising frequency duplex is very simple, only the frequency transformation of the spatial covariance matrix being additionally required as compared to the uplink, as is schematically illustrated in FIG. 11 at 70.

Figure 11:
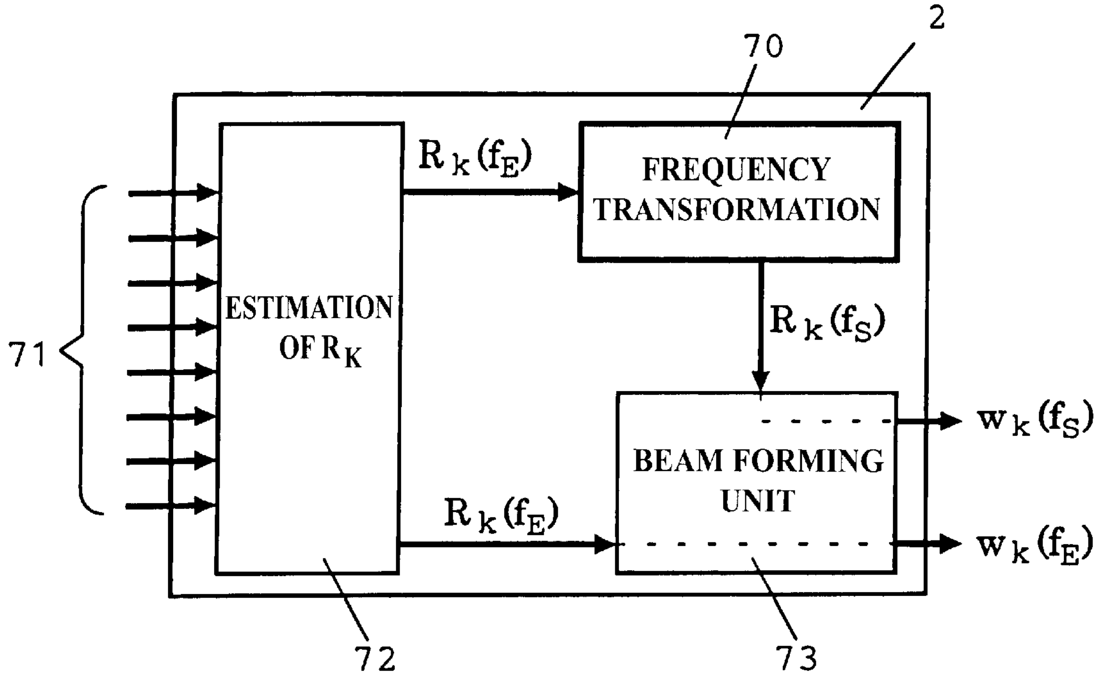
FIG. 11 schematically illustrates the structure of the signal processing unit used to calculate the antenna weights for beam formation.

FIG. 11 generally depicts the structure of the signal processing unit 2 used to calculate the antenna weights for the adaptive antenna 1, the reception signals being schematically indicated at 71. At 72, the unit used to estimate the uplink covariance matrices $R_k$ is shown, and at 73 the beamforming unit. The antenna weights determined are denoted by $W_k(f_S)$ for the downlink and by $W_k(f_E)$ for the uplink.

What is claim is:

1. A beamforming method for an adaptive antenna array including several antenna elements in a downlink of frequency duplex systems, the method comprising:

determining antenna weights for the antenna elements for downlink transmission based on directional information of an uplink and based on a power angle spectrum of the uplink of individual users, and modifying the power angle spectrum by masking out undesired regions.

2. The method of claim 1, further comprising estimating the power angle spectrum using a spread code or midamble signal sequence.

3. The method of claim 1, further comprising estimating the power angle spectrum based on a spatial covariance matrices of the uplink of the individual users.

4. The method of claim 3, further comprising estimating the power angle spectrum based on mean values of spatial covariance matrices of the uplink of the individual users.

5. The method of claim 1, further comprising determining respective spatial covariance matrix of the downlink based on the modified power angle spectrum of the individual users.

6. The method of claim 5, further comprising determining the spatial covariance matrix of the downlink based on a mean value of the modified power angle spectrum.

7. The method of claim 5, wherein determining the antenna weights is also based on the mean value of the spatial covariance matrix of the downlink.

8. A beamforming device for an adaptive antenna array including several antenna elements in the downlink of frequency duplex systems, the device comprising:

a signal processing unit configured to determine antenna weights for the antenna elements for downlink transmission based on directional information of an uplink and on power angle spectrum of the uplink of individual users upon modification of the power angle spectrum by masking out undesired regions.

9. The device of claim 8, wherein the signal processing unit is fed with a spread code or midamble signal sequence to estimate the power angle spectrum.

10. The device of claim 8, wherein the signal processing unit is arranged to estimate the power angle spectrum based on a spatial covariance matrices of the uplink of individual users.

11. The device of claim 10, wherein the signal processing unit forms the mean values of the spatial covariance matrices of the uplink.

12. The device of claim 8, wherein the signal processing unit is arranged to determine the respective spatial covariance matrix of the downlink based on the modified power angle spectrum of the individual users.

13. The device of claim 12, wherein the signal processing unit forms the mean value of the modified power angle spectrum to determine the respective spatial covariance matrix of the downlink.

14. The device of claim 12, wherein the signal processing unit forms the mean value of the spatial covariance matrix of the downlink to calculate the antenna weights for transmission.

* * * * *